(12) United States Patent
Rusiecki et al.

(10) Patent No.: US 12,254,488 B2
(45) Date of Patent: Mar. 18, 2025

(54) SYSTEM AND METHOD FOR DIGITAL AD CONFIGURATION

(71) Applicant: ACK VENTURES HOLDINGS UK, LIMITED, London (GB)

(72) Inventors: Andrew Rusiecki, New York, NY (US); Jeremy Sadwith, New York, NY (US); Harry Kargman, New York, NY (US)

(73) Assignee: ACK VENTURES HOLDINGS, LLC, Boca Raton, FL (US)

( * ) Notice: Subject to any disclaimer, the term of this patent is extended or adjusted under 35 U.S.C. 154(b) by 0 days.

(21) Appl. No.: 16/311,897

(22) PCT Filed: Jun. 30, 2017

(86) PCT No.: PCT/GB2017/051938
§ 371 (c)(1),
(2) Date: Dec. 20, 2018

(87) PCT Pub. No.: WO2018/002660
PCT Pub. Date: Jan. 4, 2018

(65) Prior Publication Data
US 2019/0205924 A1    Jul. 4, 2019

(30) Foreign Application Priority Data
Jun. 30, 2016 (GB) .................................... 1611381

(51) Int. Cl.
*G06Q 30/0242* (2023.01)
*G06Q 30/0241* (2023.01)

(52) U.S. Cl.
CPC ..... *G06Q 30/0246* (2013.01); *G06Q 30/0241* (2013.01); *G06Q 30/0276* (2013.01); *G06Q 30/0277* (2013.01)

(58) Field of Classification Search
CPC .......................................... G06Q 30/02–0277
See application file for complete search history.

(56) References Cited

U.S. PATENT DOCUMENTS

| 7,130,807 B1 | 10/2006 | Mikurak |
| 8,341,047 B1 | 12/2012 | Furney et al. |

(Continued)

FOREIGN PATENT DOCUMENTS

| WO | 2013/188953 A1 | 12/2013 | |
| WO | 2014/149608 A1 | 9/2014 | |
| WO | WO-2017040578 A1 * | 3/2017 | ............. G06F 16/23 |

OTHER PUBLICATIONS

Joanne Hinds "What demographic attributes do our digital Footprints Reveal?" PLoS One, 13(11), e0207112, Nov. 28, 2018 (Year: 2018).*

(Continued)

*Primary Examiner* — Raquel Alvarez
(74) *Attorney, Agent, or Firm* — McCarter & English, LLP

(57) ABSTRACT

A technique for dynamic digital ad configuration of digital ads being displayed on web pages and other digital properties is discussed. In one embodiment a site-specific Ad Tag is used to formulate a request for ad creatives for a publisher web page based on previously stored website configuration settings and dynamically retrieved targeting parameters. Ad creatives satisfying the request are identified and advertiser configuration settings for the identified and retrieved ad creative may be further adjusted based on the publisher website configuration settings before the ad creative is displayed on the website. Further, the site-specific Ad Tag may continue to monitor a performance of the displayed ad creative after the ad creative has been displayed on the web page of the publisher to optimize display and acquire information.

24 Claims, 6 Drawing Sheets

(56) References Cited

U.S. PATENT DOCUMENTS

| | | | |
|---|---|---|---|
| 8,402,387 B1 | 3/2013 | Iversen | |
| 8,600,830 B2 | 12/2013 | Hoffberg | |
| 8,755,837 B2 | 6/2014 | Rhoads et al. | |
| 9,292,493 B2 | 3/2016 | Chandramouli et al. | |
| 9,818,136 B1 | 11/2017 | Hoffberg | |
| 9,922,345 B2 | 3/2018 | Mikurak | |
| 10,115,124 B1 | 10/2018 | Kamvysselis | |
| 11,315,143 B2 | 4/2022 | Goksel et al. | |
| 2007/0027754 A1 | 2/2007 | Collins et al. | |
| 2008/0114639 A1 | 5/2008 | Meek et al. | |
| 2008/0294523 A1 | 11/2008 | Little | |
| 2010/0082411 A1 | 4/2010 | Goyal et al. | |
| 2010/0100415 A1* | 4/2010 | Plummer | G06Q 30/02 705/14.41 |
| 2010/0293063 A1* | 11/2010 | Atherton | G06Q 30/02 705/14.73 |
| 2010/0317420 A1 | 12/2010 | Hoffberg | |
| 2010/0324999 A1* | 12/2010 | Conway | G06Q 30/02 705/14.73 |
| 2011/0137721 A1 | 6/2011 | Bansal | |
| 2011/0191140 A1 | 8/2011 | Newman et al. | |
| 2011/0191170 A1 | 8/2011 | Zhang et al. | |
| 2011/0231264 A1 | 9/2011 | Dilling et al. | |
| 2011/0295762 A1 | 12/2011 | Scholz et al. | |
| 2012/0054607 A1 | 3/2012 | Otsuka | |
| 2012/0059707 A1 | 3/2012 | Goenka et al. | |
| 2012/0089455 A1 | 4/2012 | Belani et al. | |
| 2012/0124037 A1 | 5/2012 | Lee et al. | |
| 2012/0130802 A1 | 5/2012 | Shimizu | |
| 2012/0254333 A1 | 10/2012 | Chandramouli et al. | |
| 2012/0323674 A1 | 12/2012 | Simmons et al. | |
| 2013/0018719 A1 | 1/2013 | Abraham et al. | |
| 2013/0081081 A1 | 3/2013 | Wang | |
| 2013/0124298 A1 | 5/2013 | Li et al. | |
| 2013/0138428 A1 | 5/2013 | Chandramouli et al. | |
| 2013/0165143 A1 | 6/2013 | Ziskind et al. | |
| 2013/0273968 A1 | 10/2013 | Rhoads et al. | |
| 2013/0325530 A1 | 12/2013 | Pal et al. | |
| 2014/0040008 A1 | 2/2014 | Belani et al. | |
| 2014/0046777 A1 | 2/2014 | Markey et al. | |
| 2014/0089782 A1 | 3/2014 | Cook | |
| 2014/0120864 A1 | 5/2014 | Manolarakis et al. | |
| 2014/0195345 A1 | 7/2014 | Lyren | |
| 2014/0244406 A1 | 8/2014 | Garcia-Martinez et al. | |
| 2014/0278930 A1 | 9/2014 | Brixius et al. | |
| 2014/0279056 A1 | 9/2014 | Sullivan et al. | |
| 2014/0279793 A1 | 9/2014 | Wohlstadter | |
| 2014/0297404 A1 | 10/2014 | Bruich | |
| 2014/0358667 A1 | 12/2014 | Beltramo, Jr. | |
| 2015/0006295 A1 | 1/2015 | Liu et al. | |
| 2015/0025948 A1 | 1/2015 | Sankaran et al. | |
| 2015/0127310 A1 | 5/2015 | Grandison et al. | |
| 2015/0254566 A1 | 9/2015 | Chandramouli et al. | |
| 2015/0254732 A1 | 9/2015 | Snyder | |
| 2015/0269628 A1 | 9/2015 | Urtso et al. | |
| 2015/0278387 A1 | 10/2015 | Stergiou et al. | |
| 2015/0302436 A1 | 10/2015 | Reynolds | |
| 2015/0310494 A1 | 10/2015 | Goldberg et al. | |
| 2015/0379556 A1 | 12/2015 | Udassin | |
| 2016/0026920 A1 | 1/2016 | Sullivan et al. | |
| 2016/0065655 A1* | 3/2016 | Bentley | H04L 67/10 709/201 |
| 2016/0210660 A1 | 7/2016 | Flynn | |
| 2016/0210671 A1 | 7/2016 | Seljan et al. | |
| 2016/0254970 A1 | 9/2016 | Bartholomew et al. | |
| 2016/0260135 A1 | 9/2016 | Zomet et al. | |
| 2016/0357501 A1 | 12/2016 | Burton | |
| 2016/0358205 A1 | 12/2016 | Beltramo, Jr. | |
| 2017/0091810 A1 | 3/2017 | McGovern et al. | |
| 2017/0351978 A1 | 12/2017 | Bellowe | |
| 2019/0205919 A1 | 7/2019 | Goksel et al. | |
| 2022/0351238 A1 | 11/2022 | Goksel et al. | |

OTHER PUBLICATIONS

U.S. Appl. No. 16/311,907, filed Dec. 20, 2018, U.S. Pat. No. 11,315,143, Issued.

U.S. Appl. No. 17/728,039, filed Apr. 25, 2022, 2022-0351238, Published.

* cited by examiner

SYSTEM AND METHOD FOR DIGITAL AD CONFIGURATION

RELATED APPLICATION

This application is a 35 U.S.C. § 371 national stage filing of International Application No. PCT/GB2017/051938, filed on Jun. 30, 2017, which claims priority to United Kingdom Patent Application No. 1611381.3, entitled "System and Method for Digital Ad Configuration", filed Jun. 30, 2016. The entire contents of each of the foregoing applications are incorporated herein by reference in their entirety.

BACKGROUND

Most publishers have their own ad server and each web page on the publisher's website usually has one or more ad placements or ad slots for displaying advertisements (ad creatives). These ad placements/slots are characterized based on their size and location on the page. Periodically a request may be made to the publisher ad server for an ad creative to display in an available ad slot. The ad server attempts to identify an ad creative satisfying the request. Ad creatives that satisfy the request are returned to the web page for display in the available ad slot.

BRIEF SUMMARY

Embodiments of the present invention provide a technique for dynamic digital ad configuration of digital ads being displayed on web pages and other digital properties. For example, in one embodiment a site-specific Ad Tag is used to formulate a request for ad creatives for a publisher web page based on previously stored website configuration settings and dynamically retrieved targeting parameters. Ad creatives satisfying the request are identified and advertiser configuration settings for the identified and retrieved ad creative may be further adjusted based on the publisher website configuration settings before the ad creative is displayed on the website. Further, the site-specific Ad Tag may continue to monitor a performance of the displayed ad creative after the ad creative has been displayed on the web page of the publisher to optimize display and acquire information.

In one embodiment, a method for dynamic digital ad configuration includes providing a publisher-specific tag for placement in a publisher's digital ad server as an ad creative and receiving a request at a host server for a site-specific Ad Tag from the publisher-specific tag. The requesting publisher-specific tag is loaded in place of an ad creative for an ad slot on a web page of the publisher. The method also includes delivering the site-specific Ad Tag from the host server to the web page of the publisher in response to the request. The site specific Ad Tag includes pre-defined custom configuration settings for ad creatives appearing on web pages on the publisher website, wherein a request for an ad creative for the ad slot is received from the site-specific Ad Tag at a location providing ad creatives, the request for the ad creative based on the configuration settings and one or more targeting parameters dynamically identified by the site-specific Ad Tag. A first ad creative is transmitted to the requesting site-specific Ad Tag for display on the web page of the publisher in response to the request.

In another embodiment, a method for dynamic digital ad configuration, includes providing a site-specific Ad Tag for loading on a publisher web page, the site specific Ad Tag including pre-defined custom configuration settings for ad creatives appearing on web pages of a publisher website. The method also includes receiving a request for an ad creative for the ad slot from the site-specific Ad Tag at a location providing ad creatives, the request for the ad creative based on the configuration settings and one or more targeting parameters dynamically identified by the site-specific Ad Tag. Additionally the method includes transmitting to the requesting site-specific Ad Tag a first ad creative for display on the web page of the publisher in response to the request.

In one embodiment, a system for digital ad configuration, includes a host server, the host server in communication with a publisher website; and configured to provide a publisher-specific tag for placement in a publisher's digital ad server as an ad creative and to receive a request at a host server for a site-specific Ad Tag from the publisher-specific tag. The requesting publisher-specific tag is loaded in place of an ad creative for an ad slot on a web page of the publisher. The host server is also configured to deliver the site-specific Ad Tag from the host server to the web page of the publisher in response to the request. The site specific Ad Tag includes pre-defined custom configuration settings for ad creatives appearing on web pages on the publisher website, wherein a request for an ad creative for the ad slot is received from the site-specific Ad Tag at a location providing ad creatives, the request for the ad creative based on the configuration settings and one or more targeting parameters dynamically identified by the site-specific Ad Tag. A first ad creative is transmitted to the requesting site-specific Ad Tag for display on the web page of the publisher in response to the request.

In a further embodiment, a system for digital ad configuration includes a host server in communication with a publisher website; and a location providing ad creatives. The system is configured to provide a site-specific Ad Tag for loading on a publisher web page, the site specific Ad Tag including pre-defined custom configuration settings for ad creatives appearing on web pages of a publisher website. The system is also configured to receive a request for an ad creative for the ad slot from the site-specific Ad Tag at the location providing ad creatives, the request for the ad creative based on the configuration settings and one or more targeting parameters dynamically identified by the site-specific Ad Tag. Additionally the system is configured to transmit to the requesting site-specific Ad Tag a first ad creative for display on the web page of the publisher in response to the request.

BRIEF DESCRIPTION OF THE DRAWINGS

The accompanying drawings, which are incorporated in and constitute a part of this specification, illustrate one or more embodiments of the invention and, together with the description, help to explain the invention. In the drawings.

DETAILED DESCRIPTION

Advertisers expect that their ad creatives will appear and function as they want across all websites and other digital properties on which their ads run. At the same time, publishers enforce restrictions on how ads appear and function on their websites and other digital properties. Typical ad creatives served across a network of websites and other digital properties often fail to meet either the advertiser need for brand control or the publisher need for control as ad creatives are configured to appear and function almost identically across websites and other digital properties. Typical ad tech can only address this issue by creating separate instances of each ad creative to run on each different type of website or other digital property. There is little control for the publisher, advertiser or ad tech firm without investing substantial time and effort and so customization of the ad creative for an individual website or other digital property is often fixed ahead of time thereby limiting the flexibility with which digital content can be presented.

For ease of explanation herein, embodiments will be mostly be described herein with respect to web pages but the descriptions made in relation to web pages should be understood to also apply to other digital properties. Digital properties may include, but are not limited to, downloadable applications, content services within applications, digital services on home automation devices, digital services on wearable devices, and mobile WebKit-based browsers including those provided by social media companies. For example, the digital property may be a mobile WebKit browser within: Facebook®, Twitter@ and content pages within Snapchat® Discover, Google® Accelerated Mobile Pages (AMP), Facebook® Instant Articles (HA). Apple News Reader, Flipboard. and other digital locations where advertising needs to run.

Figure 1:
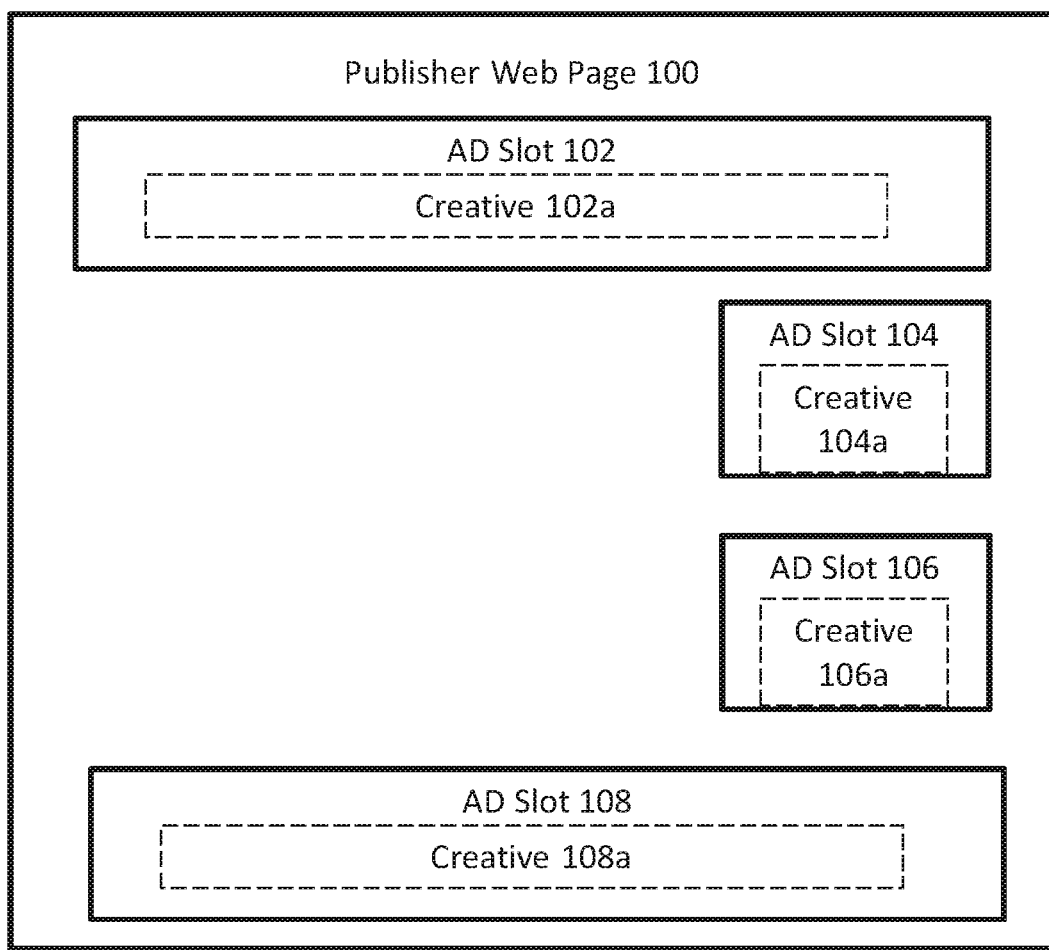
FIG. 1 (prior art) depicts a conventional web page with a number of ad slots and corresponding ad creatives.

FIG. 1 (prior art) depicts a conventional web page with a number of ad slots and corresponding ad creatives. For example, a publisher web page 100 may include ad slots 102, 104, 106 and 108. Ad creatives (advertisements) 102*a*, 104*a*, 106*a* and 108*a* may display in ad slots 102, 104, 106 and 108. The ad creatives 102*a*, 104*a*, 106*a* and 108*a* may be retrieved from the publisher's own ad server or from another source and sized to fit a particular ad slot 102, 104, 106 and 108. For example, one ad slot may be for a top banner 102 running along the top of a web page 100 and one ad slot 108 may be for a bottom banner displayed across the bottom of the web page. Additional ad slots 104 and 106 may be sized to display smaller ad creatives on a designated side of the web page 100. Further, the publisher may desire that certain ad slots display static images while dynamic ads involving motion may be allowed in other locations on the web page 100. The size and type of allowed ad creatives desired by the publisher for the available ad slot are sent to the ad server as part of the request for an ad creative. The ad server receiving the request for the ad creative attempts to identify an ad creative that meets the request requirements and returns it to the web page for display. The ad server may maintain its own content location from which to serve the ad or may relay the request to a $3^{rd}$ party content location for fulfillment.

Embodiments of the present invention provide a technique for digital ad configuration that makes it possible to simply and adaptably manage both the publisher and advertiser needs. Ad creatives may be requested using configuration data specific to a publisher's website or other digital properties that is formed in part from external data relating to the user and/or requesting web page that is dynamically retrieved at the time of the request. In one embodiment, a host server serves ad creatives through a publisher website or other digital property by initially providing the publisher with a publisher-specific tag that the publisher can traffic in the publisher's ad server as if it were an ad creative. It will be appreciated that ad creatives may be served on web pages or other digital properties. For ease of explanation herein, embodiments will be mostly be described herein with respect to web pages but the descriptions made in relation to web pages should be understood to also apply to other digital properties.

The publisher-specific tag may be a javascript tag or other executable code. Each of these publisher-specific tags is used to reference a set of options for host server-defined ad placements for the particular publisher. As the host server may only be one of many creatives in a publisher's ad server, there is often no guarantee that an ad from the host server may be on a given page at a given time. However, once the host server's publisher-specific tag is written to the publisher's web page as an ad creative, it pulls down (requests) a version of the host server's Ad Tag configuration that is specific to that publisher website. This Ad Tag configuration that is specific to the publisher's website is referred to herein as a "site-specific Ad Tag". In one embodiment the site-specific Ad Tag code includes previously stored custom configurations for host server-defined ad placements on the requesting publisher's website. As explained further below, the site-specific Ad Tag may also include publisher rules for displaying ad creatives.

In an embodiment, the code for the site-specific Ad Tag is retrieved from the host server to the web page through the use of a unique ID in the publisher's ad server. The site-specific Ad Tag that is retrieved contains a particular set of options for the publisher's website. It should be appreciated that different variations of publisher-specific tags referencing different sets of configuration options may be stored in the same publisher ad server which would result in different types of ad creatives being requested.

In one embodiment, before requesting the ad creative, the site-specific Ad Tag may request data from external sources to retrieve characteristics of the requesting user and the web page from which the request originates. Different external sources can be enabled or disabled as possible data sources based on that website's configuration data included in the site-specific Ad Tag. In other words, the site-specific Ad tag for a particular website publisher may list certain external sources as authorized sources for the external data and prohibit retrieving external data from other external sources. In one embodiment, the external data retrieved by the site-specific Ad Tag may include contextualization data and/or site visit metrics retrieved from a third party. In another embodiment, the external data may include data regarding user browsing behavior, such as, but not limited to the amount of dwell time (an average length of time a user was on a page with the window in focus) and/or an the amount of time a user spent viewing a previous ad creative. In an embodiment, the external data may also include, but is not limited to, user interaction metrics with an ad on the web page, user location, phone or carrier type, scroll depth, scroll speed, viewability data, likelihood to engage data, user-defined advertising preferences and user interaction with previously seen ads. It will be appreciated that other types of external data in addition to, or in place of, the types of external data specifically listed herein that may be used to form a request for an ad creative are also within the scope of the present invention. These external data sources are polled for data related to the current web page and/or user visiting the page. This data may be used as targeting parameters by the site-specific Ad Tag when requesting an ad creative and may later be used as parameters for advertising campaigns to target.

Once the site-specific Ad Tag has collected data from external sources, it may prepare a request for an ad creative. The configuration data defines what creative types are permitted and each creative type has a corresponding size that is added to the ad creative request. Exemplary creative types include without limitation top banner, middle banner, bottom banner and custom creative types. While a web page may need only one instance of the site-specific Ad Tag as one instance can handle making requests for multiple ad placements, it should be appreciated that the web page may contain multiple instances of a site-specific Ad Tag and the multiple site-specific Ad Tags may interact with each other in the display of one or more ad creatives.

For each ad placement, the site-specific Ad Tag may make a request to a programmatic advertising platform for a programmatic ad response. For example, the programmatic advertising platform may be the host server's own Supply Side Platform (SSP). In one embodiment, the site-specific Ad Tag sends along some of the targeting parameters it gathered before any ad slot/placement-specific information. In one embodiment, if the programmatic advertising platform returns no ad creative, or is disabled for a specific website, the site-specific Ad Tag makes a request to another location for ad creatives such as a publisher ad server. It will be appreciated that the publisher ad server may be a third party publisher not associated with the publisher hosting the publisher website described herein. For example, in one embodiment, the publisher ad server may be the host server's DFP account (Google's Doubleclick for Publishers™) or may be a third party publisher ad server not associated with either the entity controlling the host server or the publisher whose website is making the request for the ad creative. The site-specific Ad Tag may employ a waterfall model where a number of content sources are checked in a pre-determined sequence or in parallel until a creative responsive to the request is identified. The site-specific Ad Tag may pass similar targeting parameters and placement specific information to the publisher ad server as it did to the programmatic advertising platform. In an embodiment, if the programmatic advertising platform and the publisher ad server return no ad, the placement could go unfilled and not have any ad to display. In another embodiment, additional locations providing ad creatives could be searched after the initial failure to return a valid ad creative. The configuration data for the site-specific Ad Tag may include which services may be checked for ad creatives in response to a request. In one embodiment, the site-specific Ad Tag may attempt to find a valid ad creative response from multiple sources including through the use of programmatic deals, direct campaigns and passback sources. The site-specific Ad Tag may try each allowed service until it receives a valid ad creative in response. In one embodiment, each host server-defined placement can also have custom javascript code known as a passback in the event a responsive ad creative cannot be retrieved via the site-specific Ad Tag. This passback code is meant to inform the publisher of the need to separately fill the request for the ad creative so that the publisher does not miss out on the opportunity to monetize a possible ad impression.

Once the site-specific Ad Tag has received a valid ad creative in response to the request, it parses the creative code to identify custom code, which may be in the form of HTML or another markup language, that contains information specific to how the creative should be displayed. This information includes a format type and tells the site-specific Ad Tag how it should display the creative (where on the screen should it appear, whether it should animate into view, whether it should stay on screen when the user scrolls, etc.). For an ad creative directly supplied by the host server, the format included in the custom HTML may be previously added to the ad creative by the entity controlling the host server prior to the creative being trafficked. For a programmatically supplied ad creative the custom HTML may be inferred from the DSP or other platform such as by using sizes, slot positions and prices and/or other criteria. Each ad creative may have its own configuration that will be combined with the publisher's configuration for that ad creative type. This allows specific settings of the ad creative provided by the advertiser to be overridden based on a publisher's requirements. After reconciling the configuration data, the site-specific Ad Tag then renders the creative according to its own custom logic determined and standardized by the creative type.

In one embodiment, after the ad creative has been displayed, the site-specific Ad Tag continues to monitor the displayed ad creative for its placement and visibility on the page while also monitoring each of the other ad creatives on the current page. The displayed ad creatives may animate, hide, or change visibility based on other ad creatives on the page and their formats. The continued monitoring by the site-specific Ad Tag allows the site-specific Ad Tag to alter the ad creative after rendering depending on custom rules defined by creative type. These rules also allow individual creatives to affect the behavior of other creatives on the page monitored by the Ad Tag. For example, in one embodiment, the site-specific Ad Tag keeps track of other ads from the host server on the page, and only allows a single ad to appear on the screen at all times. In another embodiment, the site-specific Ad Tag monitors the situation where a user scrolls down and one ad creative drops off the screen and another ad creative loads. This continued monitoring allows for enforcement of publisher rules. In one embodiment, publisher rules for competitive separation between advertisers are enforced to ensure that competitor's advertisements are not being displayed simultaneously or in immediate proximity to each other. Similarly, publisher rules regarding frequency capping which limit the number of times the same ad creative can be viewed back to back in a single session may be enforced.

The continued monitoring also may ensure that the web page does not become covered in ads. Such monitoring is important because ads can appear on any part of the screen, and some ad formats can even adhere to various portions of the screen. For example, a hover ad is a banner that adheres to the bottom of the screen. Its location persists as the user scrolls down the page. If another ad enters the viewport, the hover is hidden until the viewport is clear of other ads. Such continued monitoring by the site-specific Ad Tag allows for customized creatives such as two ad creatives interacting with each other, creative tracking and error reporting, and ad targeting across publishers in a large network.

Figure 2:
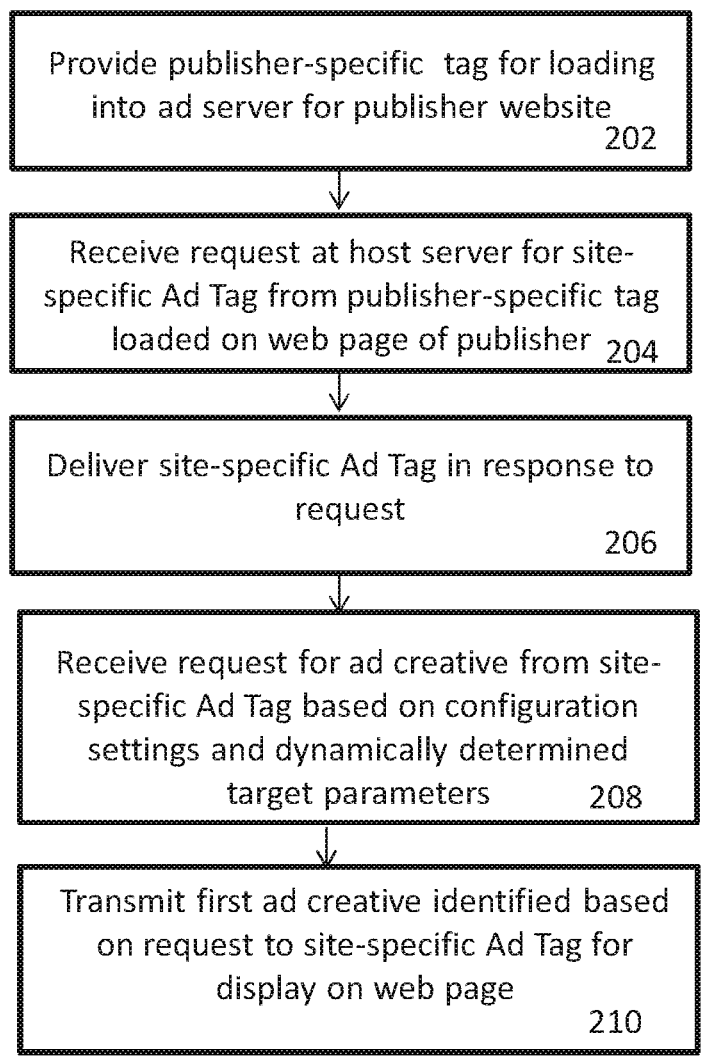
FIG. 2 depicts an exemplary sequence of steps followed by an embodiment of the present invention to serve an ad using a site-specific Ad Tag.

FIG. 2 depicts an exemplary sequence of steps followed by an embodiment of the present invention to serve an ad creative using a site-specific Ad Tag. The sequence begins with a host server providing a publisher-specific tag, such as a javascript tag, to a publisher for inclusion among ad creatives being trafficked in the publisher's ad server (step 202). The publisher-specific tag includes a unique ID that corresponds to a set of configuration options developed by the entity controlling the host server for the publisher's web site. In one embodiment the publisher-specific tag is associated with a specific ad slot on a web page. Subsequently, a request to the publisher ad server for an ad creative for a web page on the publisher's website results in the publisher-specific tag being loaded on a web page. The loading triggers a request to the host server for a site-specific Ad Tag (step 204). The host server delivers the site-specific Ad Tag which includes data for pre-defined custom configurations for ad creatives that are to be displayed on the specific publisher website in response to the request (step 206) (as described further below, in an alternate embodiment, the site-specific Ad Tag may be part of and load with the rest of the publisher's web page and not have to be dynamically retrieved from the host server). The site-specific Ad tag handles the ad creative requests for the ad slots on the page. The site-specific Ad Tag may also include a tracker to confirm the number of times that the publisher-specific tag has been used by the publisher. Before requesting the ad creative, the site-specific Ad Tag dynamically determines additional target parameters to form the request by incorporating data retrieved from external data sources. In one embodiment, an indication of the authorized external data sources for the particular publisher is included in the configuration data of the site-specific Ad Tag. This external data may include checking with third party sources to acquire contextualization data and/or site visit metrics to determine additional information about a user visiting the publisher web page and/or data regarding web page traffic. After acquiring the external data, a request for an ad creative satisfying the publisher specific configuration requirements and the dynamically determined targeting parameters is sent by the site-specific Ad Tag. In one embodiment, the request is initially received by a programmatic advertising platform (step 208). The programmatic advertising platform may be associated with the entity controlling the host server. In another embodiment, the request may be received by a publisher ad server. In another embodiment, the request may be received by another location holding ad creative content, including third party locations not associated with the entity controlling the host server. It will be appreciated that the request may indicate which ad creative sources may be used to satisfy the request and may indicate an order in which the sources are contacted. Once a first ad creative satisfying the request is identified, the first ad creative is returned to the requesting site-specific Ad Tag for display on the web page (step 210). The site-specific Ad Tag may send data back to the host server regarding each ad impression.

In one embodiment, the site-specific Ad Tag upon receiving the first ad creative may override specific settings for the first ad creative that conflict with the publisher requirements. For example, an advertiser setting that may be in conflict with the publisher configuration may be a minor setting that is not included in the parameters contained in the request for the ad creative but nonetheless need to be complied with before the ad creative is displayed on the publisher web page. For example, an advertiser may opt to include visual and experiential effects in their ad creative that the publisher may choose not to authorize. In this case, the publisher preference will override the creative-specified setting.

Figure 3:
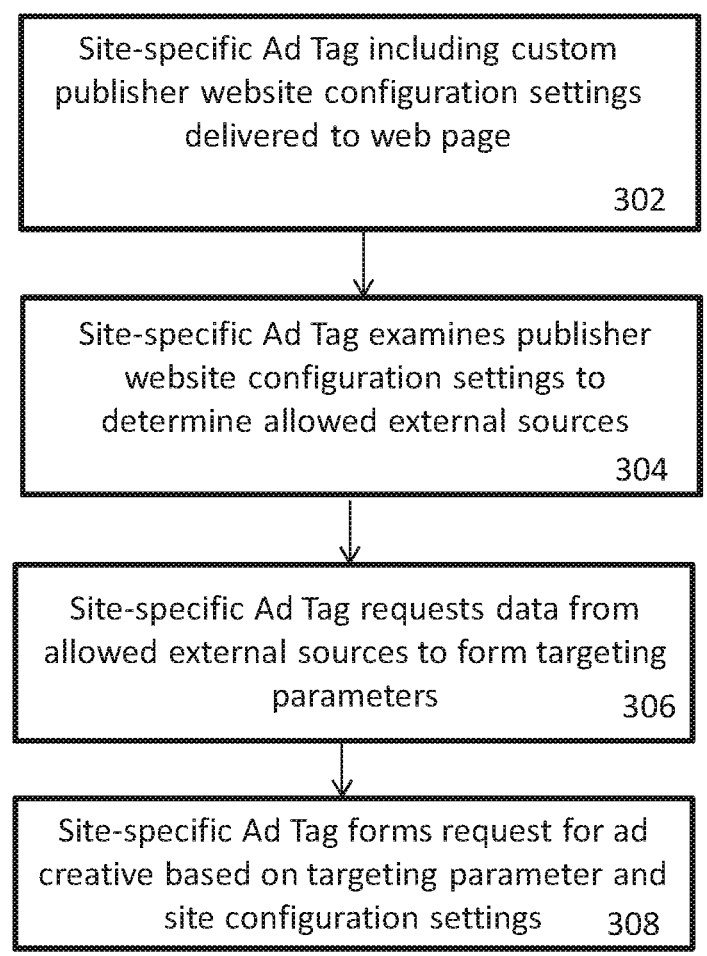
FIG. 3 depicts an exemplary sequence of steps followed by an embodiment of the present invention to identify targeting parameters for a request for an ad creative using a site-specific Ad Tag.

FIG. 3 depicts an exemplary sequence of steps followed by an embodiment of the present invention to identify targeting parameters for a request for an ad creative using a site-specific Ad Tag. The sequence begins with a site-specific Ad Tag being delivered to the publisher's web page (step 302). In an alternate embodiment, the site-specific Ad Tag is part of the web page and is loaded with the web page. Upon receiving a request for an ad creative from a publisher-specific tag as described herein, the site-specific Ad Tag consults its configuration data to determine allowed external data sources from which it is authorized to request data (step 304). The site-specific Ad Tag requests data from authorized external sources to identify data such as data about the user visiting the publisher web page and page/website traffic data (step 306). In one embodiment, the external data may be contextualization data such as provided by a keyword targeting system for editorial content such as provided by Grapeshot™. In one embodiment, the external data may be site metric data such as provided by a data management platform such as provided by Krux™. In another embodiment, the external data may be data regarding user dwell time and the amount of time that a user has viewed an ad creative such as data provided by a measurement or analytics platform providing attention and/or viewability data such as provided by MOAT™, IAS™ or DoubleVerify™. It will be appreciated that the data sources are not necessarily exclusive and data from multiple sources may be requested and acquired from the site-specific Ad Tag, either simultaneously or asynchronously. The retrieved data may be used by the site-specific Ad Tag to form targeting parameters for a request for an ad creative for the publisher web page (step 308). The requested targeting parameters include, but are not limited to, size, positional targeting. 3rd party user measurement ID, format targeting (valid ad creative types), contextual targeting anti-targeting, page info and device info.

Figure 4:
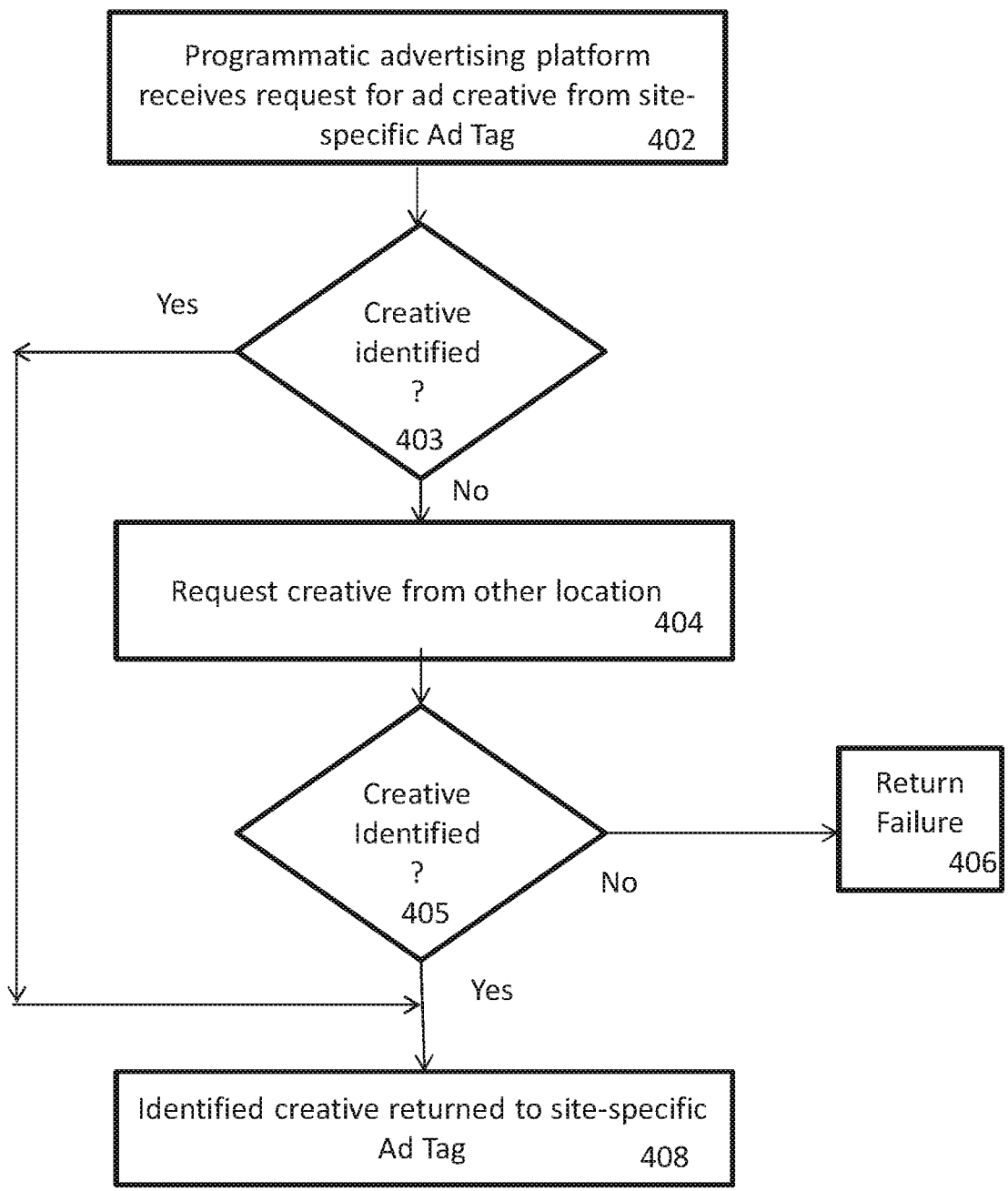
FIG. 4 depicts an exemplary sequence of steps followed by an embodiment of the present invention to retrieve an ad creative using a site-specific Ad Tag.

FIG. 4 depicts an exemplary sequence of steps followed by an embodiment of the present invention to retrieve an ad creative using a site-specific Ad Tag. The sequence begins with the site-specific Ad Tag sending a request for an ad creative to a programmatic advertising platform (step 402). In one embodiment, the programmatic advertising platform is associated with the host server. As described above, the request may be formed by the site-specific Ad Tag based on a combination of previously defined configuration data specific to the publisher website and data dynamically retrieved from external sources that relates to the user requesting the web page and/or site/page related data. If the programmatic advertising platform identifies an ad creative meeting the request parameters (step 403), the responsive ad creative is returned to the site-specific Ad Tag for display on the publisher web page (step 408). If the programmatic advertising platform is unable to identify an ad creative meeting the request parameters (step 403), the request may be sent to a different location to attempt to identify a responsive ad creative (step 404). For example, the request may be sent to a DFP account associated with an entity controlling the host server or may be sent to a third party location providing ad creatives that are not associated with the entity controlling the host server. If a responsive ad is identified (step 405), the responsive ad creative is returned to the site-specific Ad Tag for display on the publisher web page (step 408). Alternatively, if no responsive ad can be identified (step 405), a failure message may be returned to the site-specific Ad Tag (step 406). Depending on implementation, the site-specific Ad Tag may respond to the failure to serve a responsive ad in a number of ways. For example, a default ad creative from the host server may be displayed, the request may be edited to include more expansive parameters that are easier to satisfy and resubmitted, the ad slot may be left unfilled by the site-specific Ad Tag and reported to the Ad Server so the publisher can fill with its own ad creative, etc.

Figure 5:
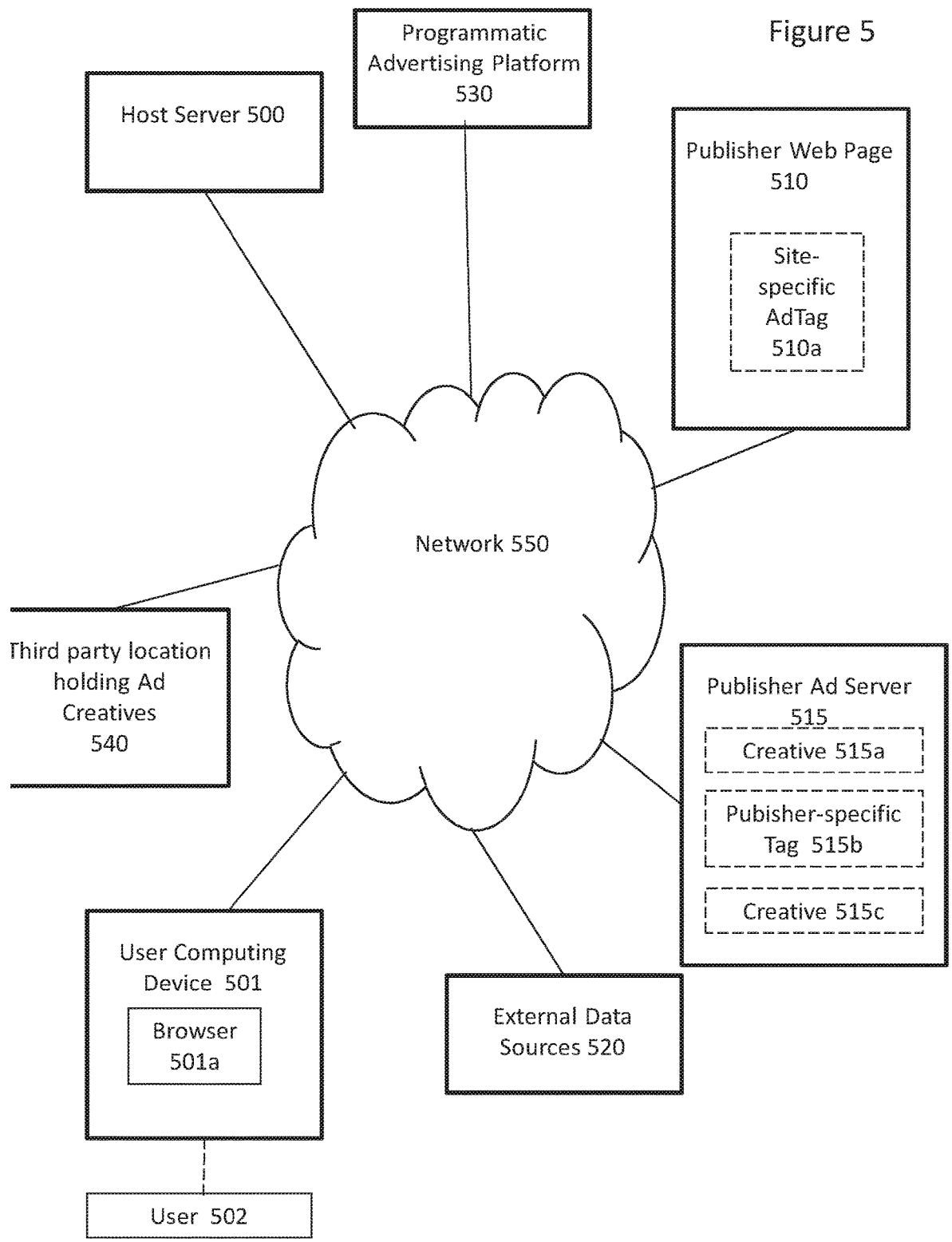
FIG. 5 depicts an exemplary network environment suitable for practicing embodiments of the present invention.

FIG. 5 depicts an exemplary network environment suitable for practicing embodiments of the present invention. A host server 500 is in communication over a network 550 with a publisher web page 510 hosted by a publisher server (not shown). Network 550 may include, but is not limited to, the Internet, an intranet, a LAN (Local Area Network), a WAN (Wide Area Network), a MAN (Metropolitan Area Network), a wireless network, an optical network, and the like. A user 502 may attempt to access publisher web page 510 via user computing device 501 and web browser 501a running thereon. User computing device 501 may be a personal computer, laptop, tablet, smartphone, netbook or some other type of computing device equipped with a processor, memory and a web browser. Upon receiving the request from the web browser 501a to access publisher web page 510, the web page may communicate with publisher ad server 515 to retrieve ad creatives to fill ad slots on the web page. The request for ad creatives may result in the publisher ad server 515 returning ad creative 515 a, publisher specific tag 515b and/or ad creative 515c. When publisher-specific tag 515b is loaded on web page 510, it automatically requests the code for site-specific Ad-Tag 510a from host server 500. FIG. 5 depicts site-specific Ad Tag 510a after its retrieval from host server 500.

Continuing with the description of FIG. 5, when site-specific Ad Tag 510a is loaded on web page 510, its execution causes it to retrieve external data from external data sources 520 over network 550. As discussed above, in one embodiment, the external data may relate to the requesting user, user computing device 501 and/or site visit metrics with respect to web page 510. Authorized external data sources for the specific publisher may be listed or otherwise indicated in the configuration data contained within Ad Tag 510a. Once retrieved, the site-specific Ad Tag uses the external data to form targeting parameters that in combination with the configuration data form the basis of a request for an ad creative sought for display on web page 510. Site-specific Ad Tag 510a may send the request to ad creative sources in sequence or parallel until a responsive ad creative is retrieved. For example, in one embodiment, site-specific Ad Tag 510a may send the request for an ad creative first to programmatic advertising platform 530 and if unsuccessful, may send the request to a third party location holding ad creatives 540 such as a third party publisher not associated with either the entity controlling host server 500 or the publisher hosting web page 510. Alternatively, the request may be sent to other locations affiliated or not affiliated with host server 500. If a responsive ad creative is identified, it is returned to site-specific Ad Tag 510a for display on web page 510. As noted above, site-specific Ad Tag 510a may override advertiser configuration settings in certain circumstances before displaying the responsive ad creative if the settings conflict with publisher rules included in or accessible to the site-specific Ad Tag. Alternately, the site-specific Ad Tag 510a may adjust a publisher configuration setting if necessary for an advertising campaign. Once the web page 510 has loaded the ad creative, the web page may be returned to the requesting web browser 501 on the user computing device 501.

Figure 6:
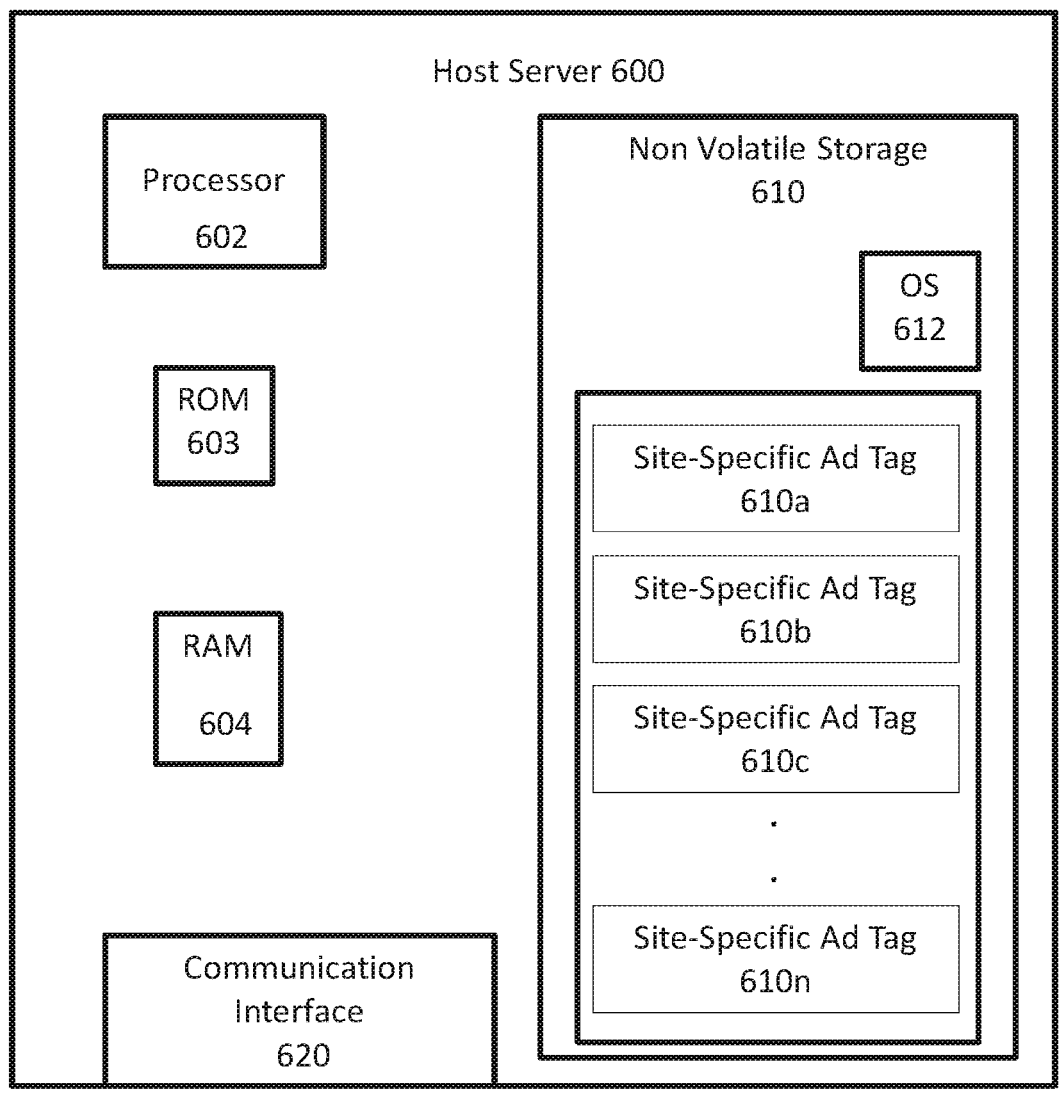
FIG. 6 depicts an exemplary host server in an embodiment of the present invention.

FIG. 6 depicts an exemplary host server in an embodiment of the present invention. Host server 600 may be a server, desktop computing device, tablet computing device, laptop or some type of other electronic device equipped with one or more processors 602. Host server 600 also includes memory in the form of non-volatile Read Only Memory (ROM) 603 and volatile Random Access Memory (RAM) 604. ROM 603 may be, but is not limited to ROM. PROM. EPROM, EEPROM, and Flash ROM. Host server 600 also includes or has access to non-volatile storage 610 such as one or more hard disk drives holding an operating system 612. Host server 600 also includes a communication interface 620 suitable for communicating over a network, such as network 550. Host server 600 may also store, or have access to multiple site-specific Ad Tags 610a, 6210b. 610c . . . 610n for one or more publishers. As discussed above, site-specific Ad Tags include sets of configuration data for publisher web sites.

Accordingly, it will be appreciated that the site-specific Ad Tag of the present invention may use data collection tools to determine a set of targeting segments for visitors to a page, may use website configurations and approvals to determine what formats can go on a web page, and may use this information to properly target an ad in a publisher-customized manner. The site-specific Ad Tag allows for a waterfall process that attempts to find a valid ad response from multiple sources (including through the use of programmatic deals, direct campaigns and passback sources), more efficiently filling web page inventory with suitable ads. When an ad creative is returned, the site-specific ad tag ensures that it renders properly on the web page. The site-specific Ad Tag may reference the format type and property-specific format configurations used to determine proper DOM manipulation.

Although the embodiments described herein have discussed the display of ad creatives on a publisher web page, it should be appreciated that the embodiments of the present invention are not limited to ad creatives displayed on a publisher web page but may include ad creatives displayed on other types of digital properties. As non-limiting examples, the ad creatives may be displayed as part of an on-demand digital placement such as publisher software apps (iOS, Android™, etc.), social media apps (Snapchat™, Kik™), content readers (Apple News Reader™ Facebook Instant Articles™) and the discussions herein related to the display of ad creatives on publisher web sites and publisher web pages should be understood to also be applicable to the display of ad creatives in different contexts other than a publisher web site and/or web page.

In another embodiment, instead of the site-specific Ad Tag being requested from, and dynamically pulled from, the host server at the time of the request for the ad creative, the site-specific Ad Tag may be preloaded on the publisher web page. In such a circumstance, the publisher web page does not retrieve the site-specific Ad Tag at the time of a request for the ad creative as the site-specific Ad Tag is already loaded automatically in the web page.

In one embodiment, instead of the site-specific Ad Tag holding configuration data that is specific to a particular publisher's website, the site-specific Ad Tag may hold a default configuration for a generic website with pre-defined configuration data (it will be appreciated that in such a case the site-specific Ad Tag will not in fact be "site-specific").

Portions or all of the embodiments of the present invention may be provided as one or more machine or computing device-readable programs or code embodied on or in one or more non-transitory mediums. The mediums may be, but are not limited to a hard disk, a compact disc, a digital versatile disc, a flash memory, a PROM, a RAM, a ROM, or a magnetic tape. In general, the computer-readable programs or code may be implemented in many computing languages.

Since certain changes may be made without departing from the scope of the present invention, it is intended that all matter contained in the above description or shown in the accompanying drawings be interpreted as illustrative and not in a literal sense. Practitioners of the art will realize that the sequence of steps and architectures depicted in the figures may be altered without departing from the scope of the present invention and that the illustrations contained herein are singular examples of a multitude of possible depictions of the present invention.

The foregoing description of example embodiments of the invention provides illustration and description, but is not intended to be exhaustive or to limit the invention to the precise form disclosed. Modifications and variations are possible in light of the above teachings or may be acquired from practice of the invention. For example, while a series of acts has been described, the order of the acts may be modified in other implementations consistent with the principles of the invention. Further, non-dependent acts may be performed in parallel.

We claim:

1. A computing device-implemented method for dynamic digital ad configuration using at least one processor, the method comprising:
    providing a publisher-specific tag for placement in a publisher's digital ad server as an ad creative;
    receiving a request at a host server for a site-specific Ad Tag from the publisher-specific tag, the requesting publisher-specific tag loaded in place of an ad creative for an ad slot on a web page of the publisher;
    delivering the site-specific Ad Tag from the host server to the web page of the publisher in response to the request, the site-specific Ad Tag:
        including pre-defined custom configuration settings for ad creatives appearing on web pages on the publisher website,
        configured to request data from one or more external sources to dynamically form a request for an ad creative for the ad slot by determining one or more targeting parameters using data received from the one or more external sources, and
        configured to monitor the ad creative after the ad creative has been displayed to enforce publisher rules regarding competitive separation of ads from different advertisers;
    wherein a request for an ad creative for the ad slot is received from the site-specific Ad Tag at a location providing ad creatives, the request for the ad creative based on the configuration settings and the one or more targeting parameters, and
    wherein a first ad creative is transmitted to the requesting site-specific Ad Tag for display on the web page of the publisher in response to the request.

2. The method of claim 1 wherein the advertiser configuration settings for the first ad creative are adjusted based on the configuration settings for the website of the publisher by the site-specific Ad Tag before display of the first ad creative.

3. The method of claim 1 wherein the targeting parameters are based on at least one of contextualization information and website visit metrics dynamically retrieved by the site-specific Ad Tag.

4. The method of claim 1 wherein the targeting parameters are based on at least one of data regarding the amount of user dwell time on a web page, the amount of time a user spent viewing an ad creative, user interaction metrics with an ad creative on the web page, user location, phone or carrier type, scroll depth, scroll speed, viewability data, likelihood to engage data, user-defined ad preferences and user interaction with previously seen ad creatives.

5. The method of claim 1, further comprising:
    creating a new ad slot with the site-specific Ad Tag in which to display the first ad creative on the web page of the publisher.

6. The method of claim 1 wherein the first ad creative is retrieved from a programmatic advertising platform associated with an entity controlling the host server.

7. The method of claim 1 wherein the first ad creative is retrieved from a publisher ad server.

8. The method of claim 1 wherein the first ad creative is retrieved from a location that is not associated with an entity controlling the host server.

9. A computing device-implemented method for dynamic digital ad configuration using at least one processor, the method comprising:
    providing a site-specific Ad Tag for loading on a publisher web page, the site-specific Ad Tag including pre-defined custom configuration settings for ad creatives appearing on web pages of a publisher website and configured to:
        request data from one or more external sources,
        dynamically form a request for an ad creative for the ad slot by determining one or more targeting parameters using data received from the one or more external sources, and
        monitor the ad creative after the ad creative has been displayed to enforce publisher rules regarding competitive separation of ads from different advertisers;
    receiving a request for an ad creative for the ad slot from the site-specific Ad Tag at a location providing ad creatives, the request for the ad creative based on the configuration settings and the one or more targeting parameters, and
    transmitting to the requesting site-specific Ad Tag a first ad creative for display on the web page of the publisher in response to the request.

10. The method of claim 9 wherein the targeting parameters are based on at least one of contextualization information and website visit metrics dynamically retrieved by the site-specific Ad Tag.

11. The method of claim 9 wherein the targeting parameters are based on at least one of data regarding the amount of user dwell time on a web page, the amount of time a user spent viewing an ad creative, user interaction metrics with an ad creative on the web page, user location, phone or carrier type, scroll depth, scroll speed, viewability data, likelihood to engage data, user-defined ad preferences and user interaction with previously seen ad creatives.

12. A non-transitory medium holding processor-executable instructions for dynamic digital ad configuration, the instructions when executed by at least one processor causing at least one computing device to:
    provide a publisher-specific tag for placement in a publisher's digital ad server as an ad creative;
    receive a request at a host server for a site-specific Ad Tag from the publisher-specific tag, the requesting publisher-specific tag loaded in place of an ad creative for an ad slot on a web page of the publisher;
    deliver the site-specific Ad Tag from the host server to the web page of the publisher in response to the request, the site-specific Ad Tag:

including pre-defined custom configuration settings for ad creatives appearing on web pages on the publisher website,
configured to request data from one or more external sources and dynamically form a request for an ad creative for the ad slot by determining one or more targeting parameters using data received from the one or more external sources, and
configured to monitor the ad creative after the ad creative has been displayed to enforce publisher rules regarding competitive separation of ads from different advertisers;
wherein a request for an ad creative for the ad slot is received from the site-specific Ad Tag at a location providing ad creatives, the request for the ad creative based on the configuration settings and the one or more targeting parameters, and
wherein a first ad creative is transmitted to the requesting site-specific Ad Tag for display on the web page of the publisher in response to the request.

13. The medium of claim 12 wherein the advertiser configuration settings for the first ad creative are adjusted based on the configuration settings for the website of the publisher by the site-specific Ad Tag before display of the first ad creative.

14. The medium of claim 12 wherein the targeting parameters are based on at least one of contextualization information and website visit metrics dynamically retrieved by the site-specific Ad Tag.

15. The medium of claim 12 wherein the targeting parameters are based on at least one of data regarding the amount of user dwell time on a web page, the amount of time a user spent viewing an ad creative, user interaction metrics with an ad creative on the web page, user location, phone or carrier type, scroll depth, scroll speed, viewability data, likelihood to engage data, user-defined ad preferences and user interaction with previously seen ad creatives.

16. The medium of claim 12, wherein the instructions when executed further cause the at least one computing device to:
create a new ad slot with the site-specific Ad Tag in which to display the first ad creative on the web page of the publisher.

17. The medium of claim 12 wherein the first ad creative is retrieved from a programmatic advertising platform associated with an entity controlling the host server.

18. The medium of claim 12 wherein the first ad creative is retrieved from a publisher ad server.

19. The medium of claim 12 wherein the first ad creative is retrieved from a location that is not associated with an entity controlling the host server.

20. A non-transitory medium holding processor-executable instructions for dynamic digital ad configuration, the instructions when executed by at least one processor causing at least one computing device to:
provide a site-specific Ad Tag for loading on a publisher web page, the site-specific Ad Tag including pre-defined custom configuration settings for ad creatives appearing on web pages of a publisher website and configured to:
request data from one or more external sources,
dynamically form a request for an ad creative for the ad slot by determining one or more targeting parameters using data received from the one or more external sources, and
monitor the ad creative after the ad creative has been displayed to enforce publisher rules regarding competitive separation of ads from different advertisers;
receive a request for an ad creative for the ad slot from the site-specific Ad Tag at a location providing ad creatives, the request for the ad creative based on the configuration settings and the one or more targeting parameters, and
transmit to the requesting site-specific Ad Tag a first ad creative for display on the web page of the publisher in response to the request.

21. The medium of claim 20 wherein the targeting parameters are based on at least one of contextualization information and website visit metrics dynamically retrieved by the site-specific Ad Tag.

22. The medium of claim 20 wherein the targeting parameters are based on at least one of data regarding the amount of user dwell time on a web page, the amount of time a user spent viewing an ad creative, user interaction metrics with an ad creative on the web page, user location, phone or carrier type, scroll depth, scroll speed, viewability data, likelihood to engage data, user-defined ad preferences and user interaction with previously seen ad creatives.

23. A system for digital ad configuration, comprising:
a host server, the host server in communication with a publisher website and configured to execute instructions with at least one processor to:
provide a publisher-specific tag for placement in a publisher's digital ad server as an ad creative;
receive a request at a host server for a site-specific Ad Tag from the publisher-specific tag, the requesting publisher-specific tag loaded in place of an ad creative for an ad slot on a web page of the publisher;
deliver the site-specific Ad Tag from the host server to the web page of the publisher in response to the request, the site-specific Ad Tag:
including pre-defined custom configuration settings for ad creatives appearing on web pages on the publisher website,
configured to request data from one or more external sources and dynamically form a request for an ad creative for the ad slot by determining one or more targeting parameters using data received from the one or more external sources, and
configured to monitor the ad creative after the ad creative has been displayed to enforce publisher rules regarding competitive separation of ads from different advertisers;
wherein a request for an ad creative for the ad slot is received from the site-specific Ad Tag at a location providing ad creatives, the request for the ad creative based on the configuration settings and the one or more targeting parameters, and
wherein a first ad creative is transmitted to the requesting site-specific Ad Tag for display on the web page of the publisher in response to the request.

24. A system for dynamic digital ad configuration, comprising:
a host server equipped with at least one processor, the host server in communication with a publisher web site; and
a location providing ad creatives, the host server configured to:
provide a site-specific Ad Tag for loading on a publisher web page, the site-specific Ad Tag including pre-defined custom configuration settings for ad creatives appearing on web pages of a publisher website and configured to:

request data from one or more external sources, dynamically form a request for an ad creative for the ad slot by determining one or more targeting parameters using data received from the one or more external sources, and monitor the ad creative after the ad creative has been displayed to enforce publisher rules regarding competitive separation of ads from different advertisers;

receive a request for an ad creative for the ad slot from the site-specific Ad Tag at the location providing ad creatives, the request for the ad creative based on the configuration settings and the one or more targeting parameters, and transmit to the requesting site-specific Ad Tag a first ad creative for display on the web page of the publisher in response to the request.

* * * * *